(12) United States Patent
Pallapa et al.

(10) Patent No.: US 11,304,045 B1
(45) Date of Patent: Apr. 12, 2022

(54) EMERGENCY COMMUNICATION SERVICE FOR MOBILE DEVICES

(71) Applicant: West Corporation, Omaha, NE (US)

(72) Inventors: Gautham Pallapa, Omaha, NE (US); Santhosh Shetty, Omaha, NE (US)

(73) Assignee: Intrado Corporation, Omaha, NE (US)

( * ) Notice: Subject to any disclaimer, the term of this patent is extended or adjusted under 35 U.S.C. 154(b) by 0 days.

(21) Appl. No.: 15/940,117

(22) Filed: Mar. 29, 2018

(51) Int. Cl.
*H04W 4/90* (2018.01)
*H04W 76/50* (2018.01)
*H04M 11/04* (2006.01)

(52) U.S. Cl.
CPC .............. *H04W 4/90* (2018.02); *H04W 76/50* (2018.02); *H04M 11/04* (2013.01)

(58) Field of Classification Search
CPC ........ H04W 4/90; H04W 76/50; H04M 11/04
See application file for complete search history.

(56) References Cited

U.S. PATENT DOCUMENTS

| | | | |
|---|---|---|---|
| 2012/0023541 A1* | 1/2012 | Wiener | H04N 7/147 725/118 |
| 2012/0295575 A1* | 11/2012 | Nam | G08B 25/08 455/404.1 |
| 2015/0271655 A1* | 9/2015 | Jatavallabhula | H04W 4/90 455/404.1 |
| 2017/0180963 A1* | 6/2017 | Cavendish | H04W 4/90 |

* cited by examiner

*Primary Examiner* — Said M Elnoubi

(57) ABSTRACT

An example method of operation may include receiving an emergency request at an emergency server to establish a communication session from a user device, initiating an emergency application on the user device, receiving content from the user device, storing the content in a memory, and determining an event severity based on the content.

20 Claims, 7 Drawing Sheets

300

250

EMERGENCY COMMUNICATION SERVICE FOR MOBILE DEVICES

TECHNICAL FIELD OF THE APPLICATION

This application relates to communications between a mobile device and an emergency communication service and more particularly to using mobile device functionality to optimize emergency monitoring and support services.

BACKGROUND OF THE APPLICATION

Conventionally, when a customer calls 911 or other related emergency service providers, the call is identified as being from a landline or a mobile device. Within a certain period of time, the call can be tracked from a location perspective via the E911 communication platform which presents cellular tower (i.e., base station) information to help pinpoint the user's location through power estimation, triangulation or a variety of other radio frequency (RF) signal measurement and estimation techniques, such as global positioning satellite (GPS).

However, location estimation based on cellular signals is just one approach to utilizing the mobile device's features to assist in the event of an emergency. For example, mobile devices have microphones, speakers, multiple cameras, light flashes, audio and video recording capabilities. Also, other features may include automatic connection attempts to nearby devices, human vital sign tracking, etc. Such additional device functions could be integrated into an emergency situation to document an incident, provide evidence in the event of a crime and help assist persons in need of such assistance.

SUMMARY OF THE APPLICATION

Example embodiments of the present application provide a method that includes at least one of receiving an emergency request at an emergency server to establish a communication session from a user device, initiating an emergency application on the user device, receiving content from the user device, storing the content in a memory, and determining an event severity based on the content.

Another example embodiment may include an apparatus that includes a memory, a receiver configured to receive an emergency request at an emergency server to establish a communication session from a user device, and a processor configured to initiate an emergency application on the user device, receive content from the user device, store the content in the memory, and determine an event severity based on the content.

Example embodiments of the present application provide a non-transitory computer readable storage medium configured to store instructions that when executed cause a processor to perform at least one of receiving an emergency request at an emergency server to establish a communication session from a user device, initiating an emergency application on the user device, receiving content from the user device, storing the content in a memory, and determining an event severity based on the content.

DETAILED DESCRIPTION OF THE APPLICATION

Figure 1:
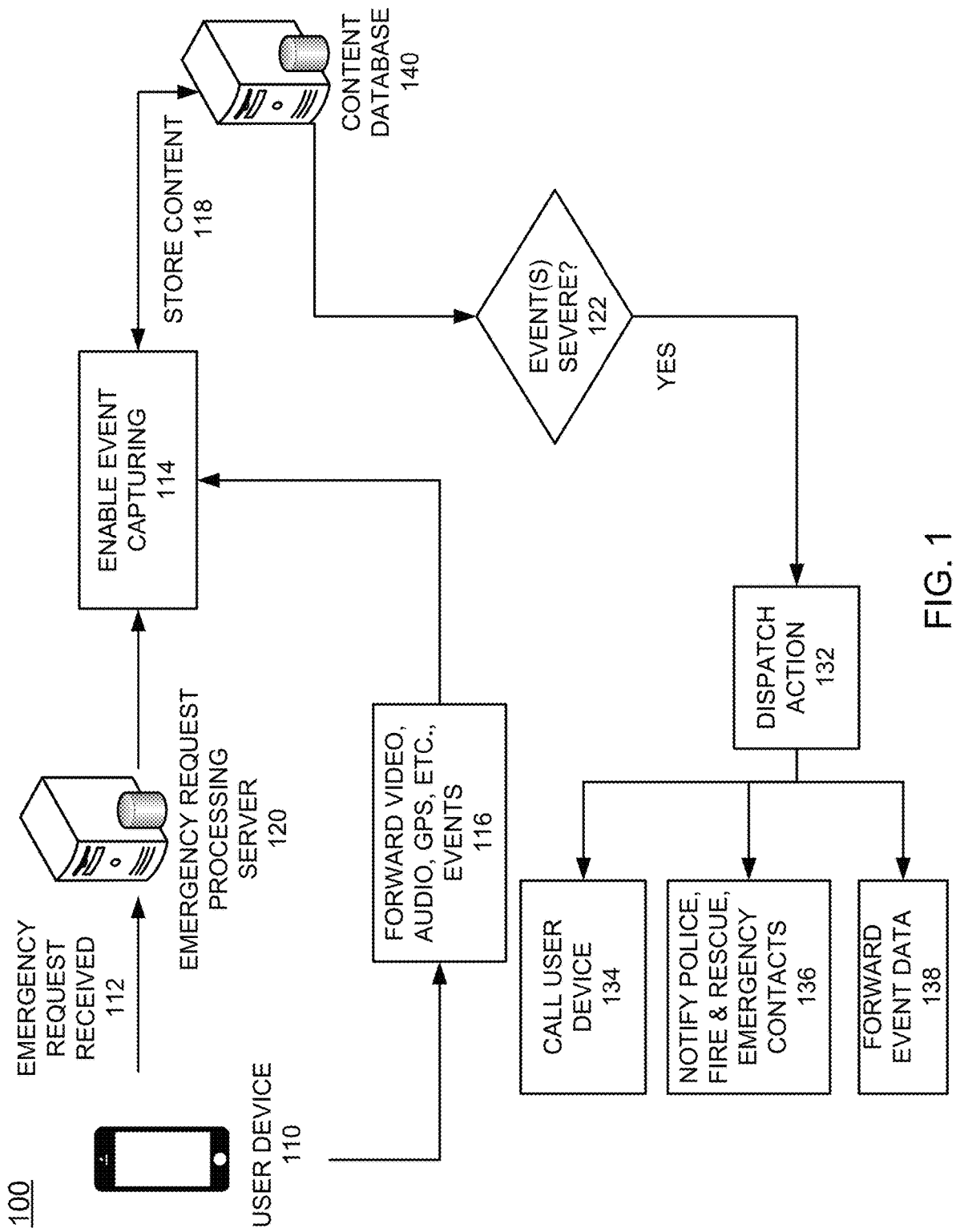
FIG. 1 illustrates an example communication logic diagram for receiving and processing emergency requests according to example embodiments of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

An application which may be operated on the mobile device may provide an activation or tracking feature which is enabled during a 911 phone call via a supplementary operation, such as an emergency-911 (E911) feature. In operation, when a user places a call to an emergency service, the application may have various features which are performed automatically or based on certain conditions, such as a period of silence, an aggravated voice being detected, any of a list of emergency words which are spoken by the user, an abrupt hang-up, etc. The conditions may be a precedent to activating the application to perform additional functions. One function may provide continuous recording of audio, video and/or other detectable events. As the recordings are performed, they may be uploaded to a central server which is setup to store the information obtained at the mobile device.

By using a passive recording system (PRS), the recordings may be performed continuously and without user interaction. The recordings may be performed in increments so that the previous recording is deleted to make space for the next recording. Only portions of the recording, or a low-quality easy to upload version of the recordings may be rendered and sent to the central server so as to not delay the sharing of the recording information, which may be a high quality video that is not easily transferred over the wireless medium. Any emergency condition could trigger other actions, such as flashing the flash light to help nearby persons identify the danger, sounding a noise alarm, or dispatching immediate help from the emergency support center.

A contextual examination may be performed prior to activating one or more the user device sensors to collect information. For example, if the device has a low battery, then it may not be prudent to launch the front camera, the reverse camera, the audio recorder, the light flash, sound emitting from the speaker, etc. Instead, the contextual indicator resulting from the battery having a low charge may yield a single recording mechanism being triggered as opposed to multiple recording mechanisms which are capable by the user device, in an effort to preserve the battery power.

Also, if there is a loss of optimal bandwidth (i.e. 3G instead of 4G), or bandwidth uploads and downloads are not fully optimal, the frame rate of the camera, the quality of the video, audio, etc., may be captured lower than an optimal quality level. The result may be longer and an increased likelihood that data is captured and forwarded in a situation that could require as much information as possible to assist the authorities with the life-saving events which ensue from the emergency event. Another example of optimized sensor use may include an example where the user device is in a zipped pocket of a coat, the video may be useless, however, the audio may still be useful along with GPS coordinates of the movement tracking the mobile device in such a scenario. As a result, the video may be processed to determine whether actual movements and productive video context are being captured or else disabling the video temporarily and attempting to re-record later after a predetermined period of time. Video, audio, GPS, images, etc., may all be captured periodically. However, if the content captured is blank, uneventful, and/or repetitive, then the capturing may be paused or postponed until a threshold amount of time has elapsed. At this point, those capturing functions may be reenacted to attempt to capture more data, however, if the content processing cannot confirm productive data, then the capturing may be suspended again pending another threshold amount of time.

Additionally, a principal information processing module may perform a pre-screening of data captured to identify what is most important and rank that data above other data that was captured which is not important. For example, if the video captured indicates certain words being spoken and/or includes people moving around and different scenes, such a video data segment may be identified as important compared to a video with no persons identified, and no intelligible language spoken, etc. Assuming both videos were captured in a period of time prior to uploading the content to the server, then the pre-processing operation may tag the first video as being more important and thus uploading that video segment first prior to any other video segment.

FIG. 1 illustrates an example communication logic diagram for receiving and processing emergency requests according to example embodiments of the present application. Referring to FIG. 1, the configuration 100 provides a user device 110, which is likely operating in an open cellular-communication reachable environment. The user device 110 may be used to dial 911 or another emergency service via an emergency application installed on the device. The emergency request 112 may arrive at a call center and/or digital communication enabled server 120 which performs analysis on the call for mobile device information, location and/or profile information of the mobile device user to identify a name and address of the person registered to use the device.

Once the communication session is established, regardless of the audio recorded during the session, the emergency application according to example embodiments may be configured to enable event capturing 114, which may provide a sequence of data requested from the application to be obtained by the user device on a periodic basis. For example, event capturing may include automated audio and/or video recordings performed by the mobile user device and saved in memory. The content generated may be upscaled/downscaled in its bit rate or quality measurement in order to be readily broadcast/uploaded from the user device to the emergency request server 120. For example, bandwidth of mobile services is always limited and thus the initial content may be high data rate content which is eventually lowered to ensure quick uploads while balancing the bandwidth constraints. For example, if a user video is captured and uploaded every 15 seconds from the user device 110 to the server 120, then the bit rate of the video may be reduced when the event status is identified as being non-severe, or the data rate appears to be compromised (i.e., 3G vs. 4G service, spotty and unreliable, etc.).

The event capturing 114 may yield many samples of video, audio, images, GPS coordinates 116 etc., over a period of time (i.e., 15 seconds, 30 seconds, one minute). The content is received and stored 118 in a content database 140. If the event is identified as being severe 122, the action may be to notify certain authorities, fire and rescue, police, sheriff's office, ambulance, water rescue team, park rangers, etc., by dispatching the action 132 to any one or more of those emergency responders 136. Also, a registered emergency contact may be dialed 134 automatically, and/or certain event data 138 may be shared with other authorities 138 to make those third parties aware of the situation. Severity may be identified by automated processing of the content, such as rapid GPS movements, certain noise indicators from audio, certain video indicators from the video, voice recognition identifying keywords, such as: help, danger, hurt, fire, accident, gun, rape, etc.

Figure 2A:
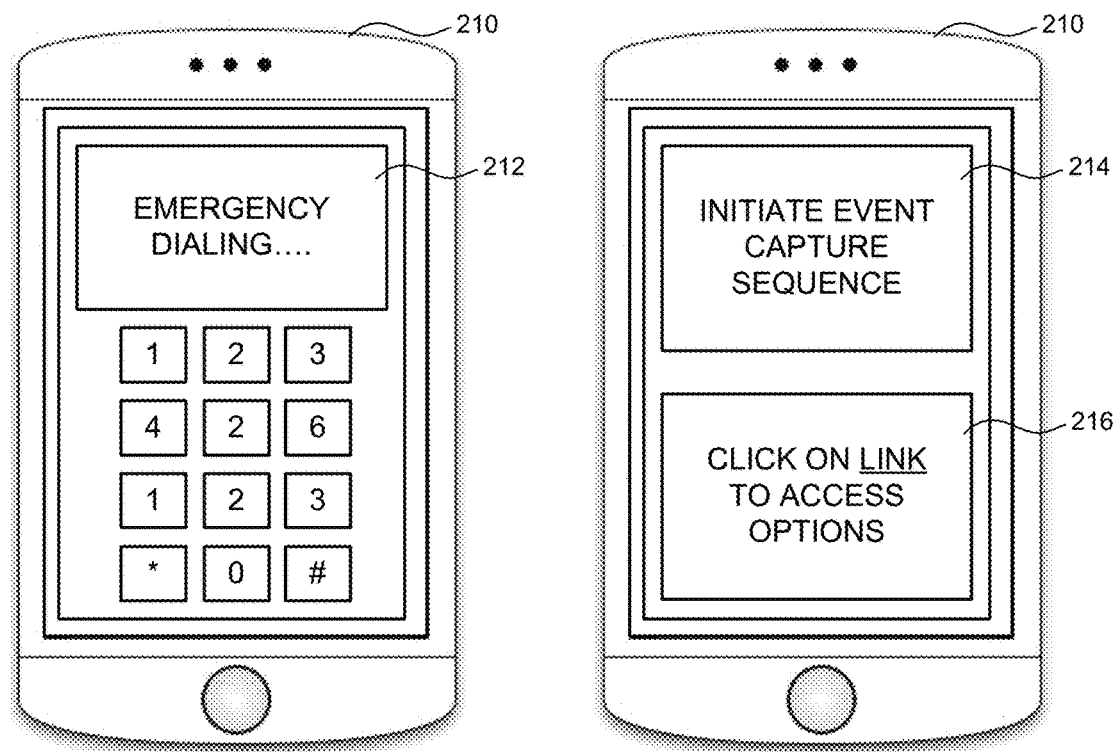
FIG. 2A illustrates a user device user interface populated with emergency session management information according to example embodiments of the present application.

FIG. 2A illustrates a user device user interface populated with emergency session management information according to example embodiments of the present application. Referring to FIG. 2A, the example interfaces 200 include basic dialing 212 of an emergency number on the user device 210 and certain options which may be setup manually or automatically 214 to capture content on the user device. Also, a link 216 may be selected to setup additional options for emergency call events.

Figure 2B:
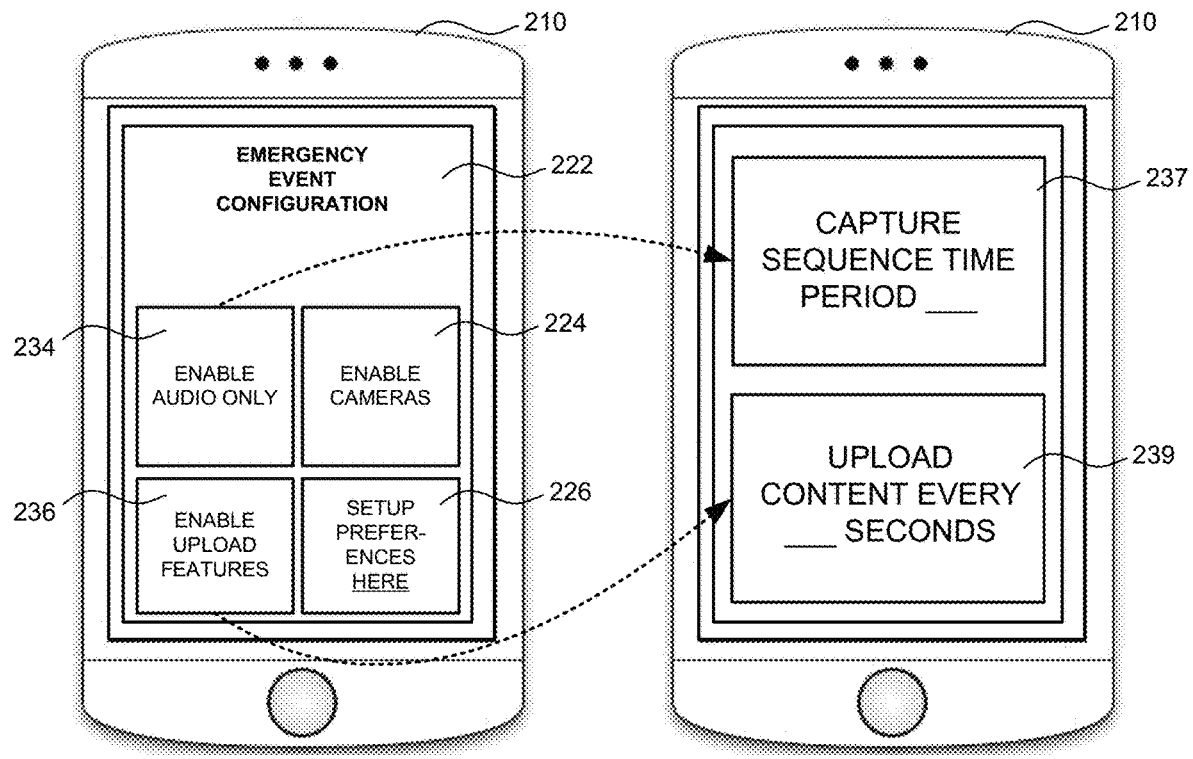
FIG. 2B illustrates another customer device user interface populated with emergency session management information according to example embodiments of the present application.

FIG. 2B illustrates another customer device user interface populated with emergency session management information according to example embodiments of the present application. Referring to FIG. 2B, in the example 250, some of the setup options for the emergency application are illustrated in a configuration menu 222. For example, the menu includes enabling audio only 234, one or more cameras 224, uploading options 236 (i.e., frequency, quality rates, content types, etc.), and setup of user preferences 226 for automated functionality. For instance, the sequence time period 237 may be set to establish how much time of content is captured prior to sending, as well as the uploading of the content 239 every so many seconds.

Figure 3:
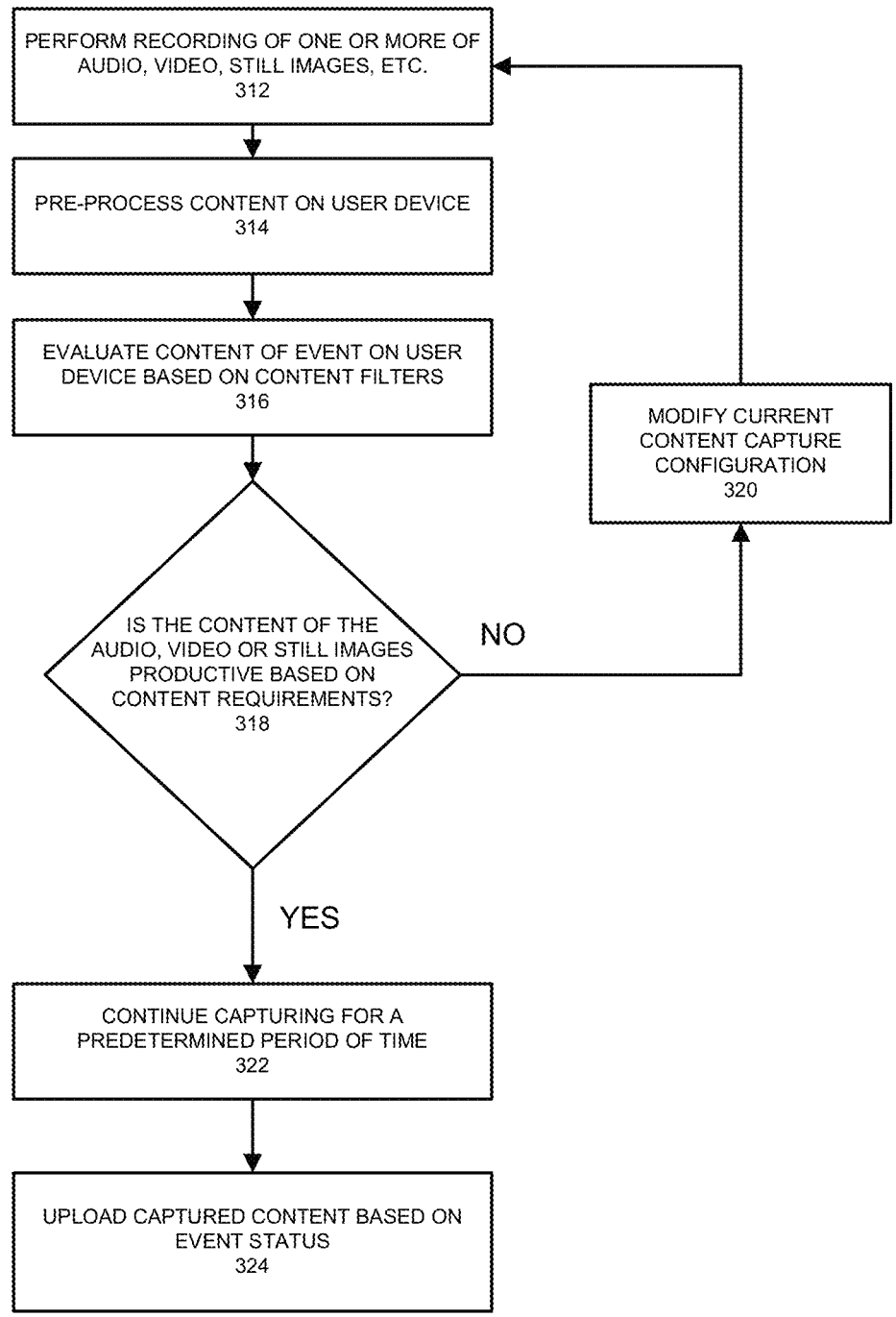
FIG. 3 illustrates a flow diagram for managing emergency content capture sessions according to example embodiments of the present application.

FIG. 3 illustrates a flow diagram for managing emergency content capture sessions according to example embodiments of the present application. Referring to FIG. 3, the flow diagram 300 provides a scenario where the uploads and content quality are modified automatically to accommodate the severity of the event and the limitations of the environment. For example, the operations include performing recordings of one or more of audio, video, still images, etc., 312. The content is pre-processed on the user device 314 and evaluated 316 to determine whether the current event matches criteria for modified content sharing. Examples of content filters may include screening for keywords of urgency to determine the importance of the content, evaluating upload quality and data rate connections to identify a likelihood of continued success based on current quality and/or location information.

Any one or more factors identified may cause a change in the current content sharing. A decision as to whether the content is 'productive' or not 318 based on the content requirements may yield a modification to the current content capture efforts 320. If the event is deemed severe, and the content is not uploading appropriately, a 'Monte Carlo' selection change-up of quality and content types may be triggered to begin changing one type of content for another and at varying data rates until the result is favorable content. One example may include reducing quality and frequency and changing from video to still images at a certain data rate of uploading to ensure content is being shared with the remote server. One example may provide continuing to capture content for a predetermined period of time 322 and uploading captured content based on an event status 324. For example, if the event status changes from not-severe to urgent and severe, changes may be necessary to provide content to the responders for intelligent planning and strategy (i.e., backup police required, river engagement equipment, fire damage, etc.).

Figure 4:
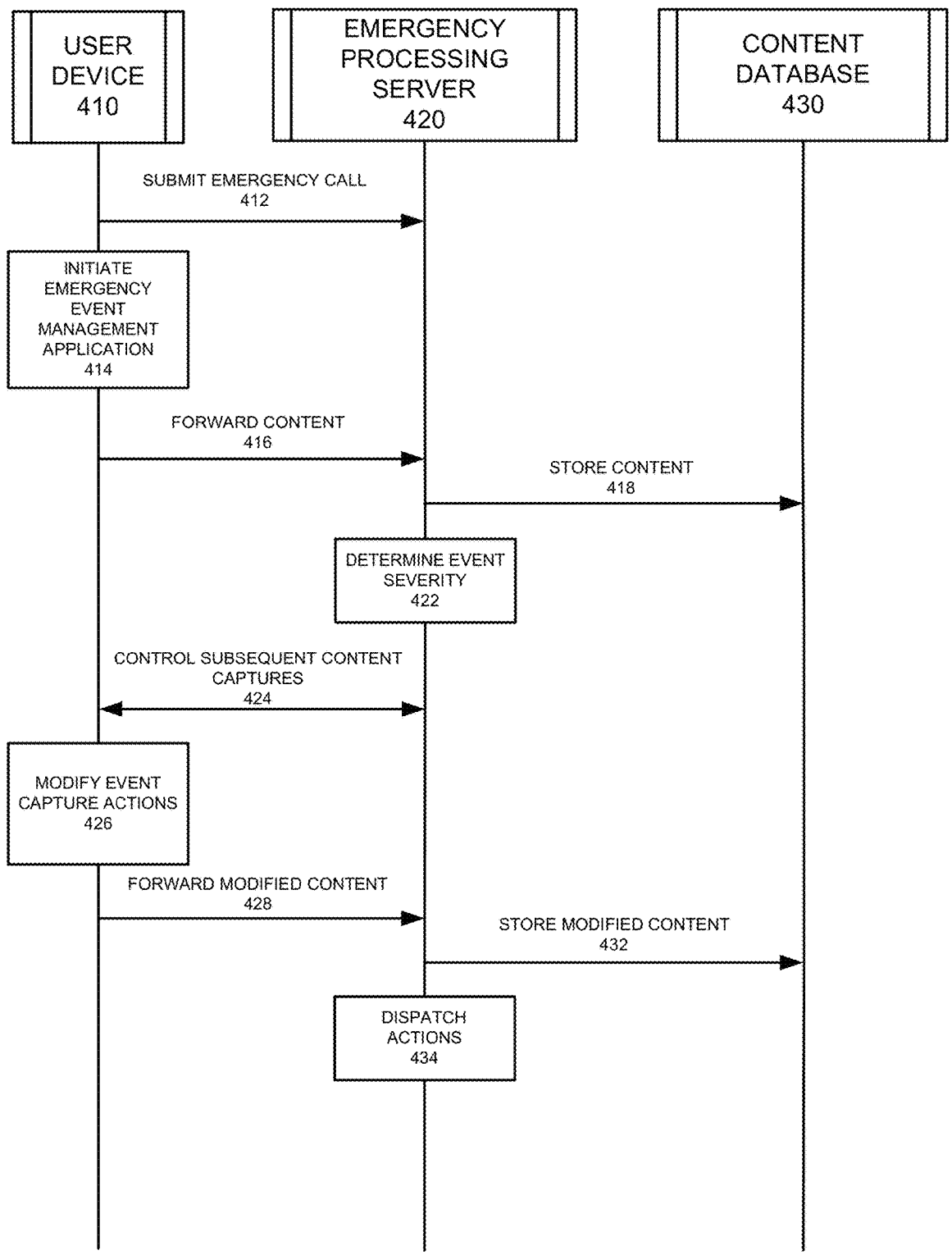
FIG. 4 illustrates a system signaling diagram for processing an emergency session configuration according to example embodiments of the present application.

FIG. 4 illustrates a system signaling diagram for processing an emergency session configuration according to example embodiments of the present application. Referring to FIG. 4, the configuration 400 includes a user device 410, an emergency processing server 420 and a content database 430 for storing content processed and received by the server 420. One example method of operation may include receiving an emergency request at an emergency server to establish a communication session from a user device. The process may include the user device 410 submitting a call for emergency help 412. The user's device may have an application installed that manages the call and/or request process by initiating 414 and communicating with the server 420. Once the communication session is established, content is forwarded 416 continuously based on the scheduled content forwarding configuration of the user device 410 and/or the server 420. Content is forwarded to a content archive for storage 418. The server 420 may determine a severity 422 of the event based on the content, processed content and/or other third party tools used to determine the event severity 422 (e.g., scale of 1 to 10, etc.). The severity of the event may cause automated control features to adjust content captures of subsequent content capturing and sharing 424. The event captures may be modified 426 according to the previous captured content received and the status of the content as well as the severity that was determined. The subsequently captured content is then forwarded 428 to the server and stored in memory 432. If any events trigger a severe rating then actions may be dispatched 434 to third parties for immediate or delayed action.

Content may include one or more of video, audio, images and location information from the user device. The method may include retrieving a user record associated with the user device, identifying user attributes, modifying a content capture event based on the user attributes, pre-processing the content to identify whether a content discrepancy exists, and when a content discrepancy exists, modifying subsequent content capture events to perform at least one of capturing a different type of content, forwarding less frequent content updates to the emergency server and suspending a type of content capturing event for a predetermined period of time. The method may also include receiving a plurality of different types of content from the user device over a predetermined period of time, modifying a content quality of the content captured by the user device, and transmitting the content to the server after the content quality has been modified.

Figure 5:
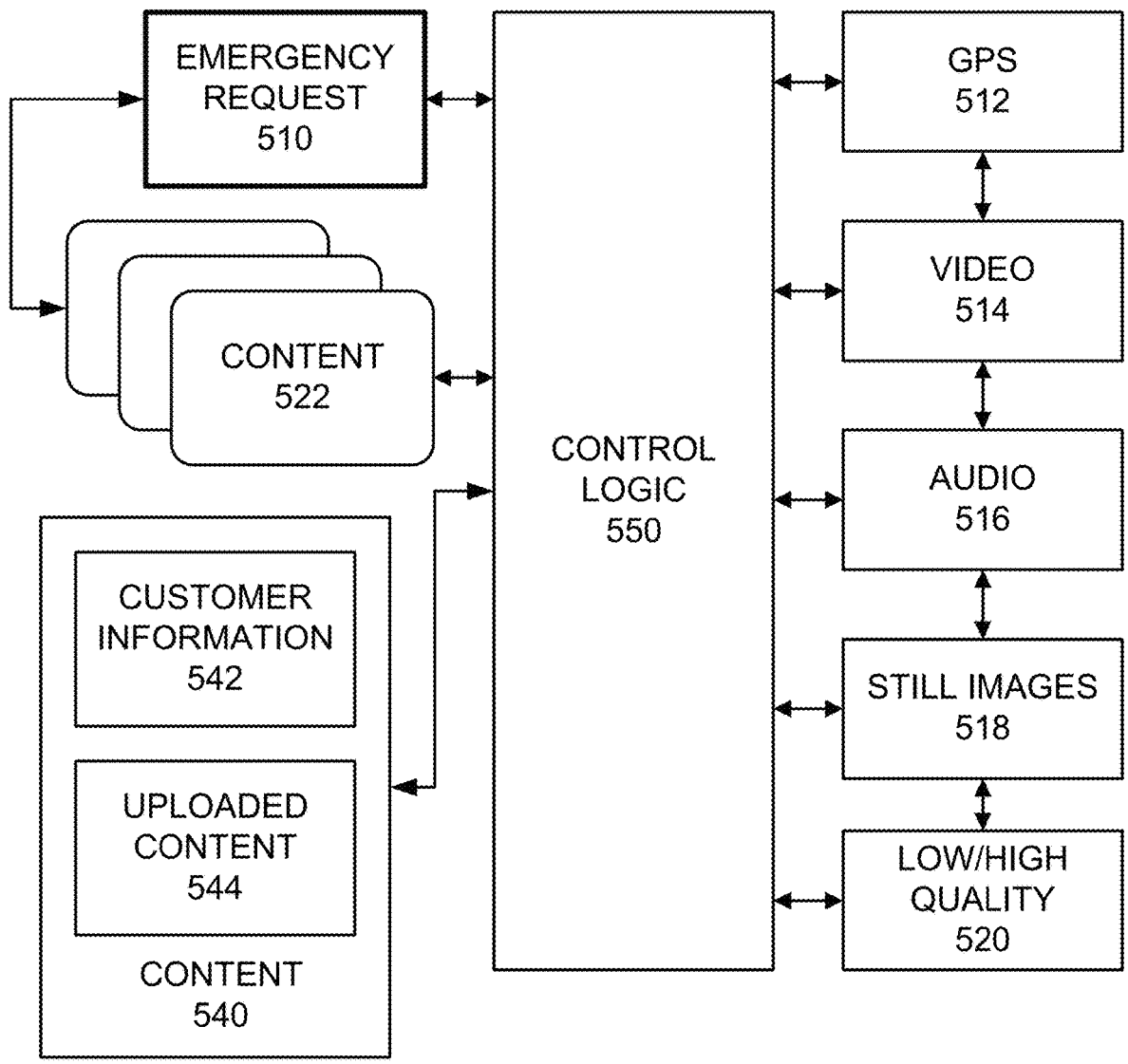
FIG. 5 illustrates a logic processing diagram with input data, a processing module and output data according to example embodiments of the present application.

FIG. 5 illustrates a logic processing diagram with input data, a processing module and output data according to example embodiments of the present application. Referring to FIG. 5, the logic processor 550 may have various input data and output data that is received, retrieved and processed to achieve results which are favorable to the objectives of the example embodiments. For instance, the emergency requests 510 are received and processed along with content 522 captured from a user device. The content 540 may include various uploaded content 544 that is received and may also include customer information 542 identifying the user device registered owner. The data information may include GPS data 512, video 514, audio 516, still images 518 and flags or parameters indicating needed changes to the bandwidth or bit rate quality 520 for uploading such data from the user device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
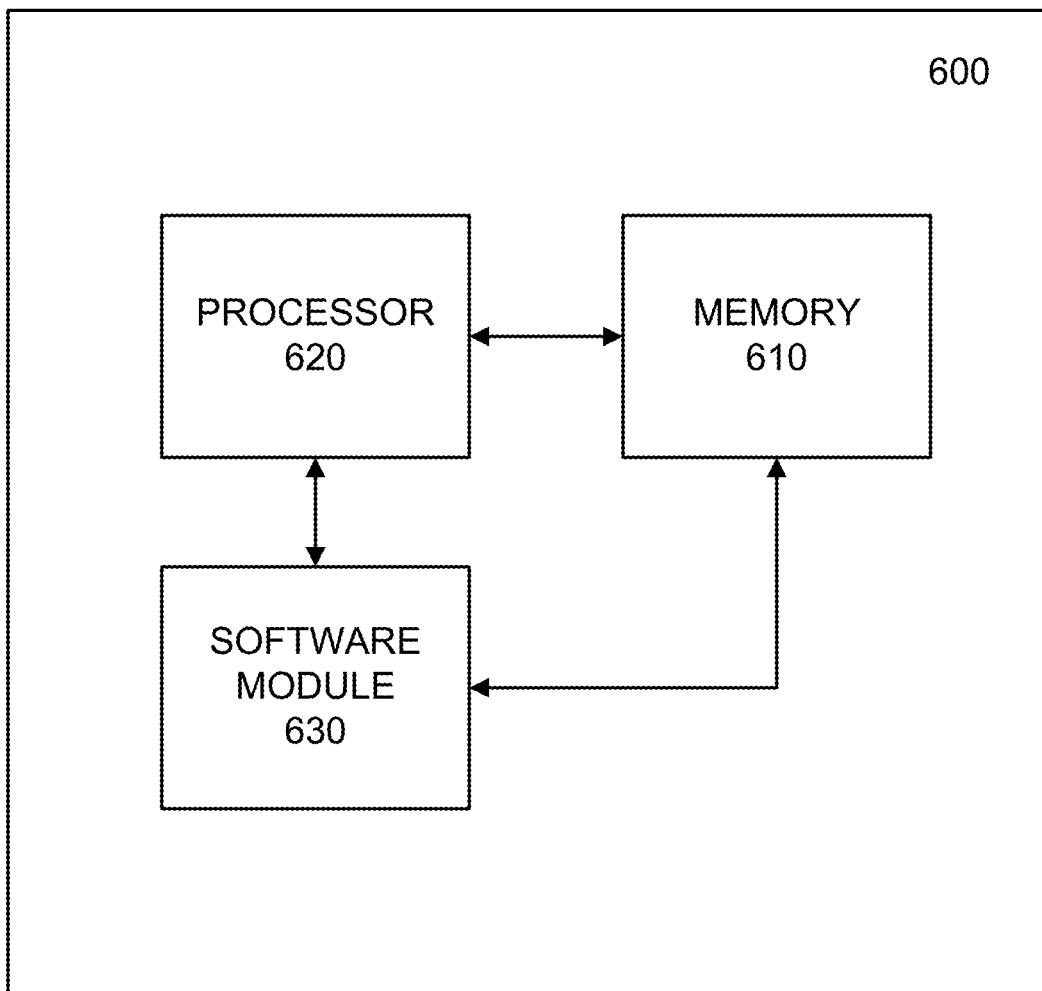
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving, by an emergency server, a call comprising an emergency request from a user device, the call generated based on an input to the user device by a user and the call establishing a communication between the user device and the emergency server;
   receiving, by the emergency server, content from the user device during the communication session, the content from an emergency application initiated on the user device;
   storing, by the emergency server, the content in a memory;
   determining, by the emergency server, an event severity based on the content and independent from information received from another user device;

automatically identifying, by the emergency server, that at least one of a change in the content and a change in a manner of capturing the content is required based on the severity level; and
automatically communicating, by the emergency server, the required change to the user device.

2. The method of claim 1, wherein the content comprises one or more of:
video, audio, images and location information from the user device.

3. The method of claim 1, further comprising:
retrieving a user record associated with the user device; and
identifying user attributes.

4. The method of claim 3, further comprising:
modifying a content capture event based on the user attributes.

5. The method of claim 1, further comprising:
pre-processing the content to identify whether a content discrepancy exists; and
when a content discrepancy exists, modifying subsequent content capture events to perform at least one of:
capturing a different type of content,
forwarding less frequent content updates to the emergency server, and
suspending a type of content capturing event for a predetermined period of time.

6. The method of claim 1, further comprising:
receiving a plurality of different types of content from the user device over a predetermined period of time.

7. The method of claim 1, further comprising:
modifying a content quality of the content captured by the user device; and
transmitting the content to the server after the content quality has been modified.

8. An apparatus, comprising:
a memory;
a receiver configured to:
receive a call comprising an emergency request from a user device, the call generated based on an input to the user device by a user and the call establishing a communication session between the user device and the emergency server; and
a processor configured to:
receive content from the user device during the communication session, the content from an emergency application initiated on the user device,
store the content in the memory,
determine an event severity based on the content and independent from information received from another user device,
automatically identify that at least one of a change in the content and a change in a manner of capturing the content is required based on the severity level, and
automatically communicate the required change to the user device.

9. The apparatus of claim 8, wherein the content comprises one or more of:
video, audio, images and location information from the user device.

10. The apparatus of claim 8, wherein the processor is further configured to:
retrieve a user record associated with the user device, and
identify user attributes.

11. The apparatus of claim 10, wherein the processor is further configured to:
modify a content capture event based on the user attributes.

12. The apparatus of claim 8, wherein the processor is further configured to:
pre-process the content to identify whether a content discrepancy exists, and
when a content discrepancy exists, modify subsequent content capture events to perform at least one of:
capture a different type of content,
forward less frequent content updates to the emergency server, and
suspend a type of content capturing event for a predetermined period of time.

13. The apparatus of claim 8, wherein the receiver is further configured to:
receive a plurality of different types of content from the user device over a predetermined period of time.

14. The apparatus of claim 8, wherein the processor is further configured to:
modify a content quality of the content captured by the user device, and
wherein the apparatus further comprises a transmitter configured to transmit the content to the server after the content quality has been modified.

15. A non-transitory computer readable storage medium configured to store one or more instructions that when executed by a processor cause the processor to perform:
receiving a call comprising an emergency request from a user device, the call generated based on an input to the user device by a user and the call establishing a communication session between the user device and the emergency server;
receiving content from the user device during the communication session, the content from an emergency application initiated on the user device;
storing the content in a memory;
determining an event severity based on the content and independent from information received from another user device;
automatically identifying that at least one of a change in the content and a change in a manner of capturing the content is required based on the severity level; and
automatically communicating the required change to the user device.

16. The non-transitory computer readable storage medium of claim 15, wherein the content comprises one or more of:
video, audio, images and location information from the user device.

17. The non-transitory computer readable storage medium of claim 15, wherein one or more instructions are further configured to cause the processor to perform:
retrieving a user record associated with the user device; and
identifying user attributes.

18. The non-transitory computer readable storage medium of claim 17, wherein the one or more instructions are further configured to cause the processor to perform:
modifying a content capture event based on the user attributes.

19. The non-transitory computer readable storage medium of claim 15, wherein the one or more instructions are further configured to cause the processor to perform:
pre-processing the content to identify whether a content discrepancy exists; and
when a content discrepancy exists, modifying subsequent content capture events to perform at least one of:

capturing a different type of content, forwarding less frequent content updates to the emergency server and suspending a type of content capturing event for a predetermined period of time.

20. The non-transitory computer readable storage medium of claim 15, wherein the one or more instructions are further configured to cause the processor to perform:

receiving a plurality of different types of content from the user device over a predetermined period of time;

modifying a content quality of the content captured by the user device; and transmitting the content to the server after the content quality has been modified.

\* \* \* \* \*